US012425085B2

(12) United States Patent
Yang et al.

(10) Patent No.: US 12,425,085 B2
(45) Date of Patent: Sep. 23, 2025

(54) PREDICTIVE CSI ENHANCEMENTS FOR HIGH SPEED SCENARIOS

(71) Applicant: APPLE INC., Cupertino, CA (US)

(72) Inventors: Weidong Yang, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Seyed Ali Akbar Fakoorian, San Diego, CA (US); Sigen Ye, San Diego, CA (US); Wei Zeng, Saratoga, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 486 days.

(21) Appl. No.: 17/933,520

(22) Filed: Sep. 20, 2022

(65) Prior Publication Data

US 2023/0128145 A1    Apr. 27, 2023

Related U.S. Application Data

(60) Provisional application No. 63/262,866, filed on Oct. 21, 2021.

(51) Int. Cl.
*H04B 7/06* (2006.01)
*H04B 7/10* (2017.01)

(52) U.S. Cl.
CPC .......... *H04B 7/0626* (2013.01); *H04B 7/0639* (2013.01); *H04B 7/10* (2013.01)

(58) Field of Classification Search
CPC ...... H04B 7/0626; H04B 7/0639; H04B 7/10; H04B 7/063; H04B 7/0663; H04B 7/048
See application file for complete search history.

(56) References Cited

U.S. PATENT DOCUMENTS

| 2012/0076236 A1* | 3/2012 | Ko ........................ H04L 5/006 |
| | | 375/296 |
| 2016/0142117 A1* | 5/2016 | Rahman ................ H04B 7/063 |
| | | 375/267 |

(Continued)

FOREIGN PATENT DOCUMENTS

| CN | 111630936 A | 9/2020 |
| CN | 113383502 A | 9/2021 |

(Continued)

OTHER PUBLICATIONS

Mei, Shaohui, et al., "Unsupervised Spatial-Spectral Feature Learning by 3D Convolutional Autoencoder for Hyperspectral Classification", IEEE Transactions on Geoscience and Remote Sensing (vol. 57, No. 9), Sep. 2019, pp. 6908-6820.

(Continued)

*Primary Examiner* — Khaled M Kassim
*Assistant Examiner* — Ahmed K Jaber
(74) *Attorney, Agent, or Firm* — Dorsey & Whitney LLP

(57) ABSTRACT

Apparatus and methods are provided to for a user equipment (UE) to report channel state information (CSI) to a base station. The UE sends UE capability signaling to a base station to indicate support of a codebook for high speed scenarios. The UE processes configuration information from the base station for CSI reporting using the codebook. The configuration information indicates measurement resources for one or more downlink (DL) channel. The UE measures a channel response and interference using the measurement resources, generates CSI feedback using the codebook for at least one ray from the base station to the UE, and reports the CSI feedback to the base station.

17 Claims, 12 Drawing Sheets

(56) References Cited

U.S. PATENT DOCUMENTS

| | | | |
|---|---|---|---|
| 2019/0372642 A1* | 12/2019 | Kakishima | H04L 5/0048 |
| 2020/0271794 A1* | 8/2020 | Sleewaegen | G01S 19/24 |
| 2022/0085855 A1* | 3/2022 | Huang | H04L 5/0023 |
| 2022/0131583 A1 | 4/2022 | Lee et al. | |
| 2022/0330039 A1* | 10/2022 | Wang | H04W 8/24 |
| 2024/0187048 A1* | 6/2024 | Yang | H04B 7/0417 |

FOREIGN PATENT DOCUMENTS

| | | |
|---|---|---|
| CN | 113519179 A | 10/2021 |
| CN | 116671051 A | 8/2023 |
| WO | 2019133048 A1 | 7/2019 |
| WO | 2021159330 A1 | 8/2021 |
| WO | 2022137048 A1 | 6/2022 |

OTHER PUBLICATIONS

Wen, Chao-Kai, et al., "Deep Learning for Massive MIMO CSI Feedback", IEEE Wireless Communications Letters (vol. 7, Issue: 5), Mar. 22, 2018, pp. 748-751.

\* cited by examiner

PREDICTIVE CSI ENHANCEMENTS FOR HIGH SPEED SCENARIOS

TECHNICAL FIELD

This application relates generally to wireless communication systems, including channel state information (CSI) feedback.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

For 3GPP Release 18 (Rel-18), predictive channel state information (CSI) has been proposed to handle high speed scenarios wherein high resolution CSI feedback may be used for multi-user multiple-input and multiple-output (MU-MIMO) pairing. However, CSI can age due to the movement of the transmitter, receiver, or the propagation environment. CSI aging can also happen due to a change in interference. For example, interference may change when a strong interference was present during CSI measurement but is no longer present during a physical downlink shared channel (PDSCH) transmission. As another example, a strong interference which is present during PDSCH transmission may not be present during CSI measurement.

In a first enhancement (enhancement 1), for channel variation fast enough so the conventional CSI feedback schemes from 3GPP Rel-15/16/17 break down, the Doppler domain compression can be considered. The Doppler domain is considered in addition to the delay domain (which is exploited in 3GPP Rel-16 and Rel-17), and the fundamental frame work as used in 3GPP Rel-15/16/17 is more or less kept.

In a second enhancement (enhancement 2), however, for very high speed scenarios, such as using a high altitude platform system (HAPS) or satellite for gNB, the model may not be valid any more.

Example Antenna Structure for gNB

Figure 1:
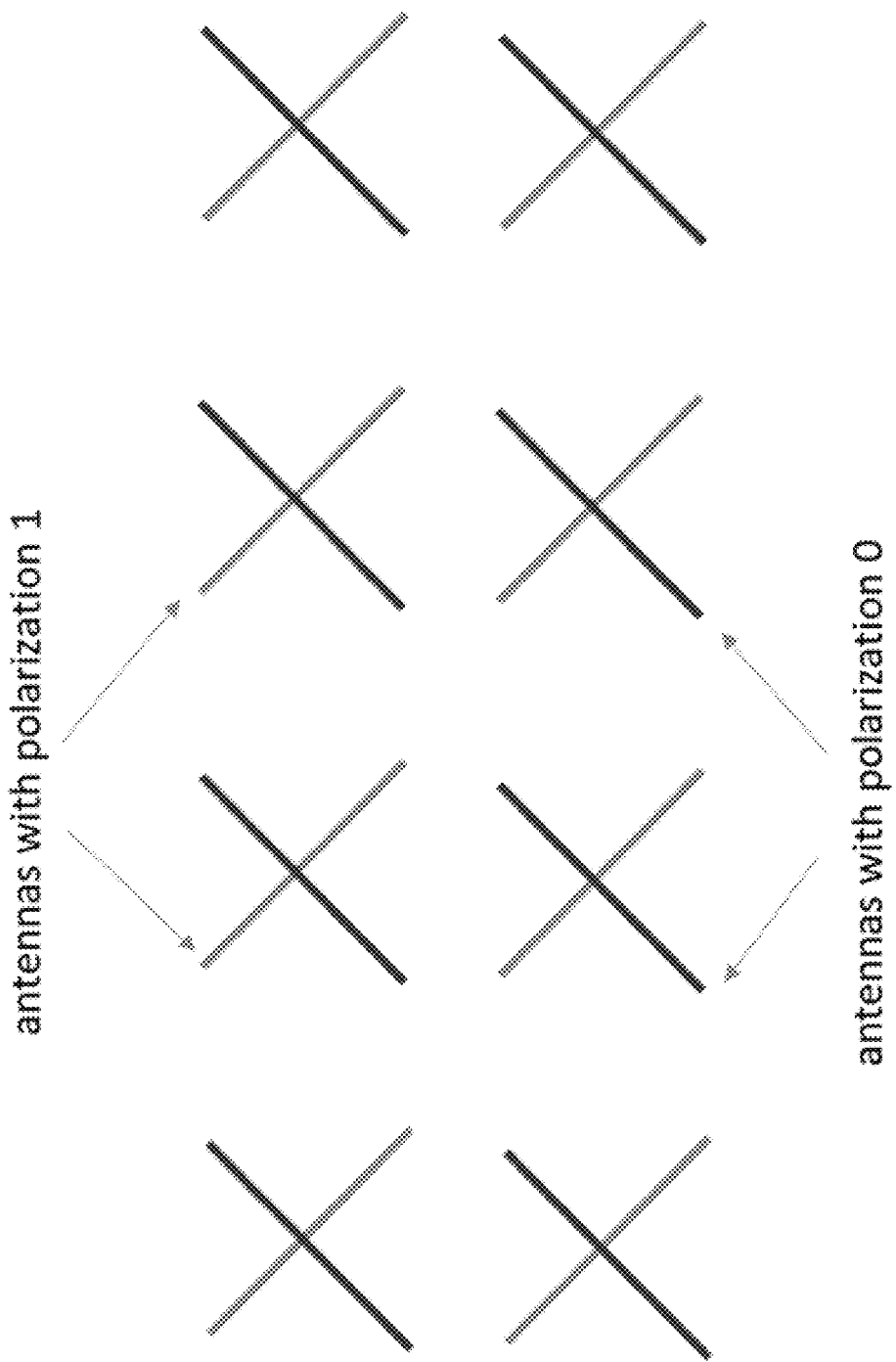
FIG. 1 illustrates an example antenna structure for a gNB in accordance with one embodiment.

FIG. 1 illustrates an example antenna structure for a gNB. As shown, regular antennas are placed on a base station antenna array, including antennas with polarization 0 and antennas with polarization 1 (e.g., +45° and −45°).

Rel-16 Design on Type II Codebook

3GPP Rel-16 Type II codebook may be of the form:

$$\begin{bmatrix} \sum_{p=0, b=1}^{B_0} A(\theta_{b,p}, \phi_{b,p}) C_{b,p} \delta(t - \tau_{b,p}) \\ \sum_{p=1, b=1}^{B_1} A(\theta_{b,p}, \phi_{b,p}) C_{b,p} \delta(t - \tau_{b,p}) \end{bmatrix}$$

where p is the polarization index (e.g., P=0 for polarization at +45° and p=1 for polarization at −45°), there are $B_0$ significant beams for transmit (Tx) antennas at polarization index 0, and $B_1$ significant beams for Tx antennas at polarization index 1. For polarization index p in a three dimensional coordinate system with a zenith angle θ and an azimuth angle ϕ (e.g., θ=0° points to the zenith and θ=90° points to the horizon), b is the ray index for a ray with departure angles $(\theta_{b,p}, \phi_{b,p})$, $A(\theta_{b,p}, \phi_{b,p})$ is the array response for (θ, ϕ), $\tau_{b,p}$ is the relative delay, and $a_b$ is the path gain including amplitude and phase for ray index b (e.g., using a ray tracing algorithm). Assuming regular antenna element arrangement, then $(\theta_{b,p}, \phi_{b,p})$ can be mapped to $(i_1, i_2, p_1, p_2)$, where $p_1$, $0 \leq p_1 \leq O_1 - 1$ and $p_2$, $0 \leq p_2 \leq O_2 - 1$ are oversampling factors for the vertical domain and the horizontal domain respectively, and $(i_1, i_2)$ are the spatial beam indices.

Codebook Construction

Precoders for a layer are given by size-P×N3 matrix $W = W_1 \tilde{W}_2 W_f^H$ (also notated for simplicity herein as $W = W_1 * W_2 * W_f$ or W=W1W2Wf), where W is the PMI matrix, $W_1$ corresponds to spatial beam selection, $\tilde{W}_2$ corresponds to bitmap design and quantizer design, and $W_f^H$ corresponds to frequency domain (FD) component selection. $P = 2N_1 N_2$ = number of spatial domain (SD) dimensions. $N_3$ = number of FD dimensions. Precoder normalization corresponds to the precoding matrix for a given rank and unit of $N_3$ being normalized to norm 1/sqrt(rank).

For SD compression, L spatial domain basis vectors (mapped to the two polarizations, so 2 L in total) are selected. Compression in the spatial domain uses $$W_1 = \begin{pmatrix} v_0 v_1 \cdots v_{L-1} & 0 \\ 0 & v_0 v_1 \cdots v_{L-1} \end{pmatrix},$$

where $\{v_i\}_{i=0}^{L-1}$ are $N_1 N_2 \times 1$ orthogonal discrete Fourier transform (DFT) vectors (e.g., as in Rel-15 Type II).

For FD compression, compression is via $w_f = [f_{k_0} f_{k_1} \cdots f_{k_{M-1}}]$, where $\{f_{k_m}\}_{m=0}^{M-1}$ are M size-$N_3 \times 1$ orthogonal DFT vectors. The number of FD-components M may be configurable.

For polarization-common spatial beam selection, L and M may be configured by the gNB.

Spatial Beam Selection

Figure 2:
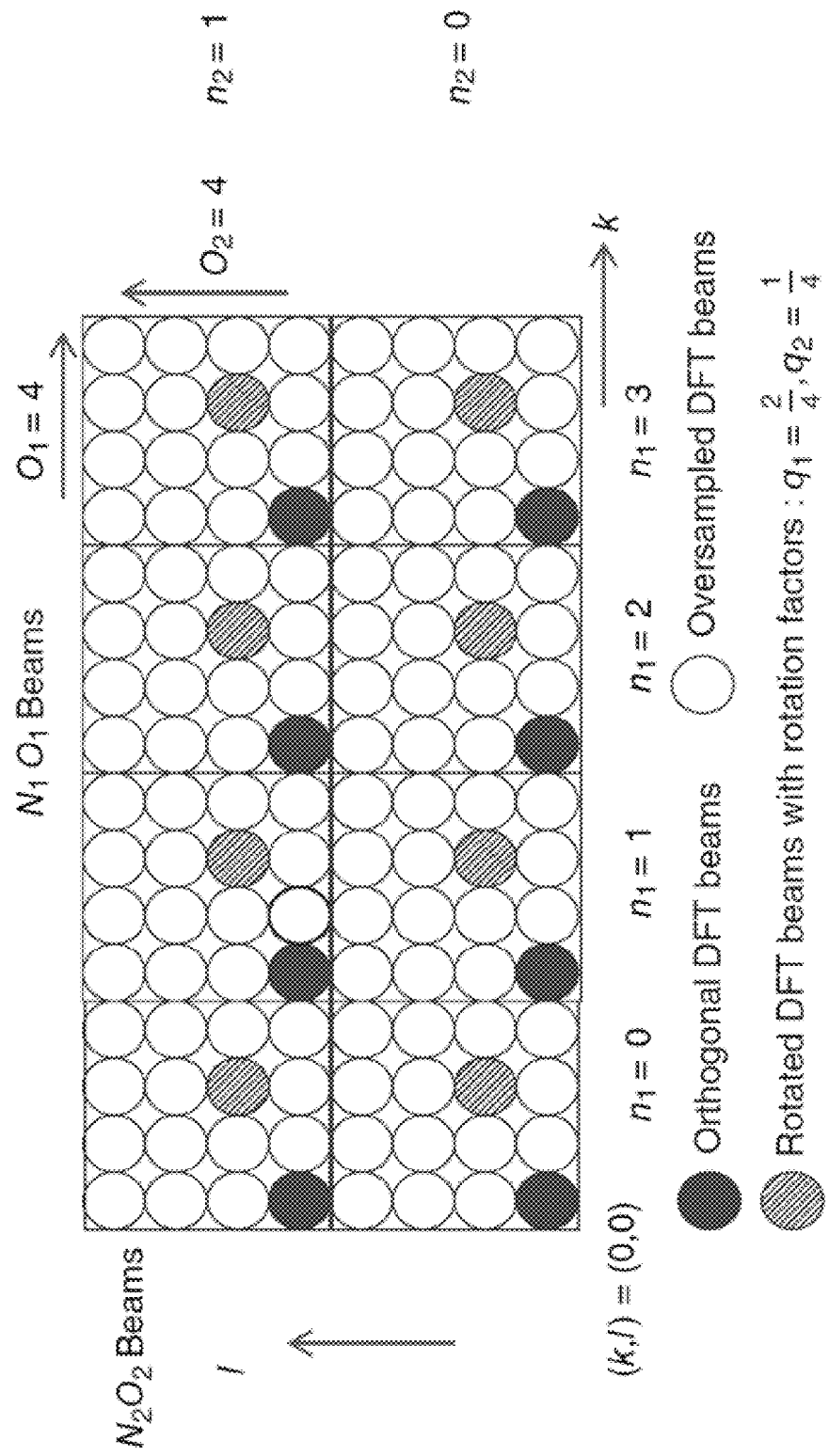
FIG. 2 illustrates an example of spatial beam selection in accordance with one embodiment.

FIG. 2 illustrates an example of spatial beam selection according to certain embodiments. In this example, $N_1$ corresponds to the number of antenna columns at the base station, $N_2$ corresponds to the number of antenna rows at the base station, $O_1$ is a first oversampling factor, $O_2$ is a second oversampling factor, k is a first direction, l is a second direction, $n_1$ represents groups in the k direction, $n_2$ represents groups in the l direction. Spatial beam indices (i1, i2) may be used to choose the main direction and spatial beam indices (q1, q2) may be used to fine-tune the direction. For orthogonal bases, the same (q1, q2) is used for all selected spatial beams.

Rel-18 Precoder Design for Enhancement 1

Figure 3:
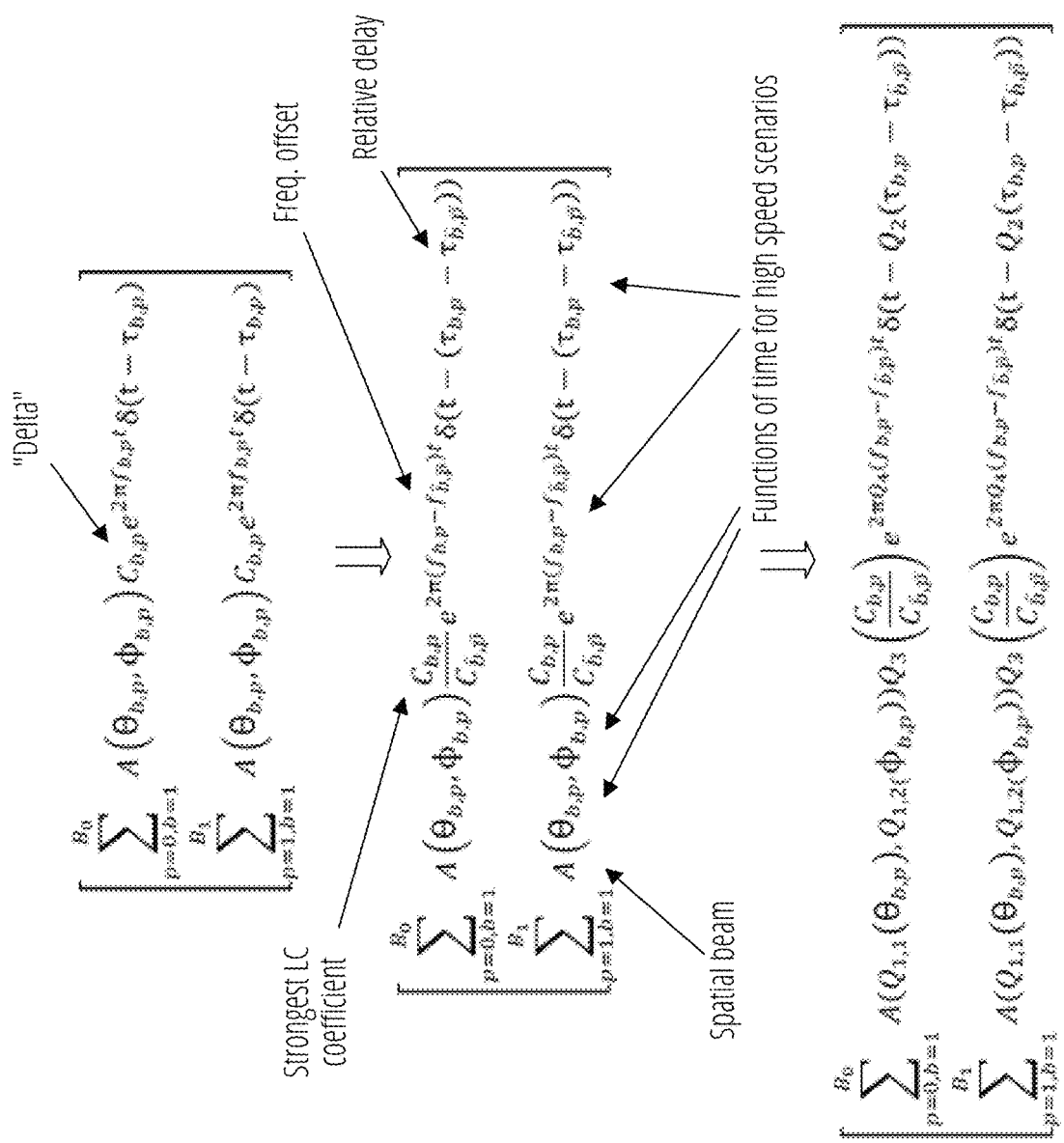
FIG. 3 illustrates a conceptual design for a CSI precoder in accordance with certain embodiments.

FIG. 3 illustrates a conceptual design for 3GPP Rel-18 CSI precoder design for enhancement 1 according to certain embodiments. As shown, the 3GPP Rel-18 precoder design for enhancement 1 includes a "delta" over the 3GPP Rel-16 design discussed above. Also illustrated are a strongest LC coefficient, spatial beam, frequency offset, and relative delay quantities. In certain such embodiments, all the quantities, such as delta delay, delta frequency offset, and spatial beams are considered as constants.

Rel-18 Precoder Design for Enhancement 2

FIG. 3 also illustrates a conceptual design for 3GPP Rel-18 CSI precoder design for enhancement 2 according to certain embodiments. The 3GPP Rel-18 precoder design for enhancement 2 also includes a "delta" over the 3GPP Rel-16 design discussed above. Also illustrated are functions of time for high speed scenarios. In certain such embodiments, all the quantities, such as delta delay, delta frequency offset, and spatial beams are considered as functions of time.

Variation for Spatial Beams

Figure 4:
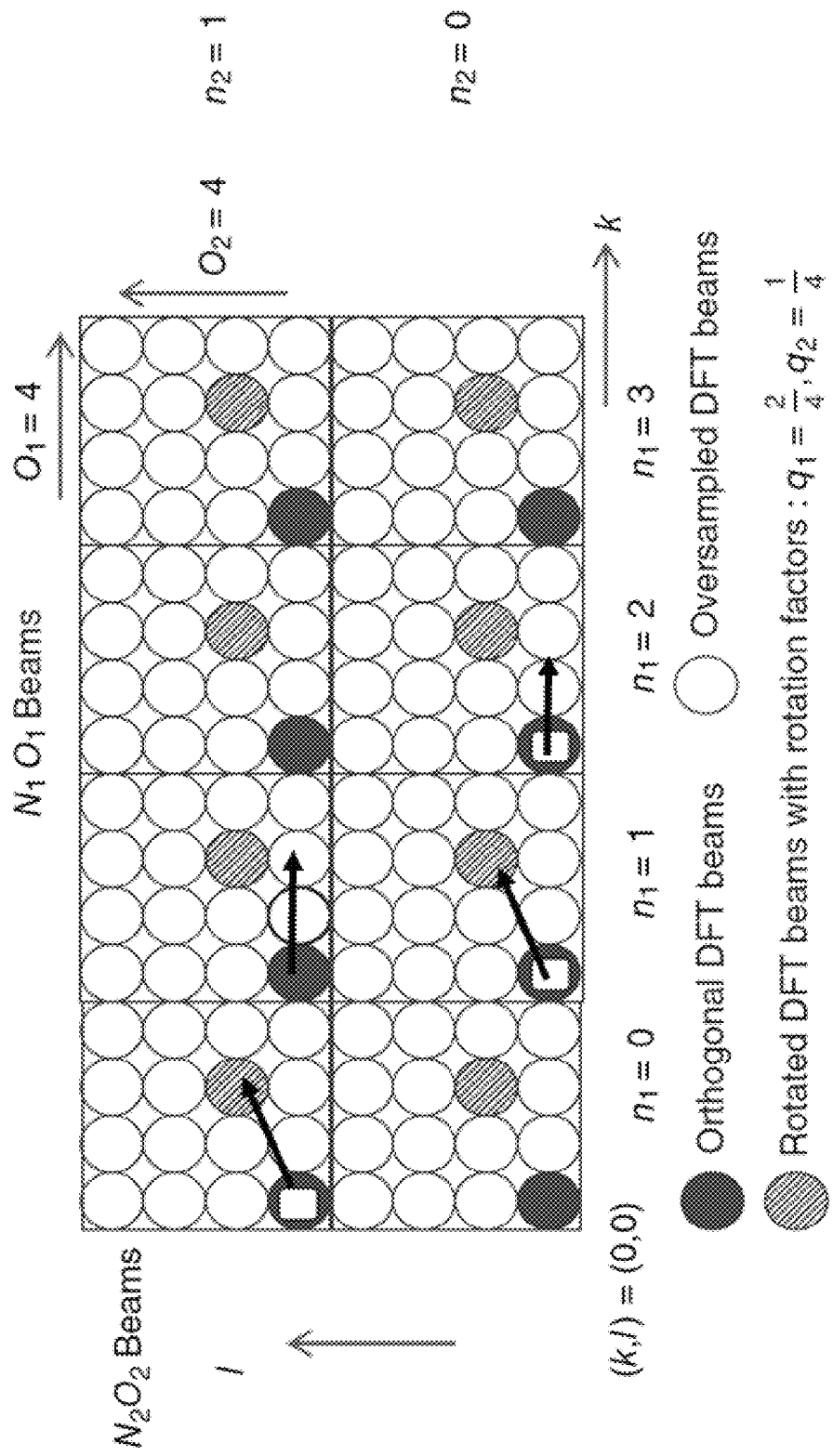
FIG. 4 illustrates example variation for spatial beams in accordance with one embodiment.

FIG. 4 illustrates example variation for spatial beams according to certain embodiments. In this example, $N_1$ corresponds to the number of antenna columns at the base station, $N_2$ corresponds to the number of antenna rows at the base station, $O_1$ is a first oversampling factor, $O_2$ is a second oversampling factor, k is a first direction, l is a second direction, $n_1$ represents groups in the k direction, $n_2$ represents groups in the l direction. Spatial beam indices (i1, i2) may be used to choose the main direction and spatial beam indices (q1, q2) may be used to fine-tune the direction. For orthogonal bases, the same (q1, q2) is used for all selected spatial beams.

In the illustration of FIG. 4, it is shown that with the passing of time, initially four spatial beams capture significant power emitting from the base station. After a while the spatial beams capture most of the power have moved to new beams as indicated by the arrows.

Variation in Relative Delay/Frequency Offset

Figure 5:
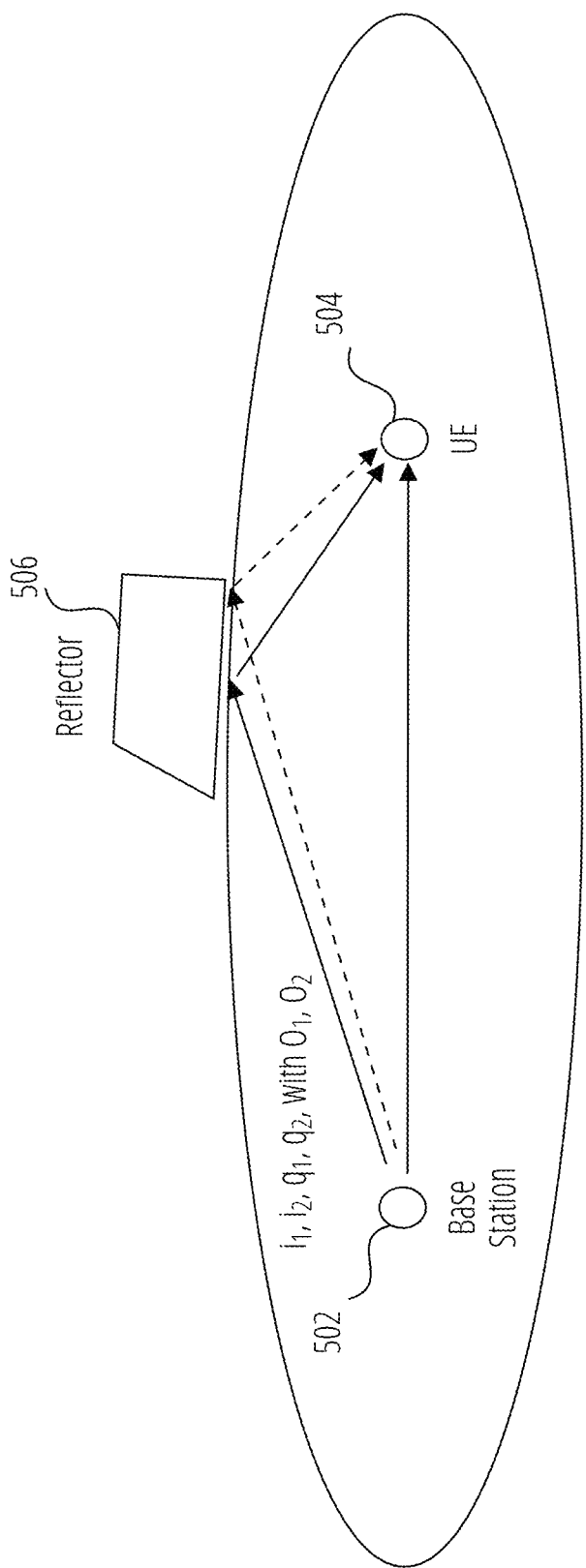
FIG. 5 illustrates example variation in relative delay and/or frequency offset in accordance with one embodiment.

In FIG. 5, for a signal from a base station 502 to a UE 504, example variation is shown in relative delay and/or frequency offset according to certain embodiments. In the illustration, it is shown initially the path taken from base station 502 to reach the UE 504 (either directly or via a reflector 506) follows the solid lines, after a while, the dashed lines are followed. The total path length can change due to that, which results in the relative delay's change. As the angle of departure and the angle of arrival at the UE change, the Doppler shift can change also, which result in change in the frequency offset.

Variation Models

Certain embodiments model the variations of spatial beams, relative delays, relative frequency offsets. The base station can then track the variations. For example, in one embodiment, spatial beam variation may be modeled with a linear model: $(\theta_{b,p} + \Delta \theta_{b,p} \cdot t, \phi_{b,p} + \Delta \phi_{b,p} \cdot t)$. As another example, in one embodiment, relative delay may be modeled with a linear model: $\tau_{b,p} + \Delta \tau_{b,p} \cdot t$. As yet another example, in one embodiment, relative frequency offset may be modeled with a linear model: $f_{b,p} + \Delta f_{b,p} \cdot t$.

Figure 6:
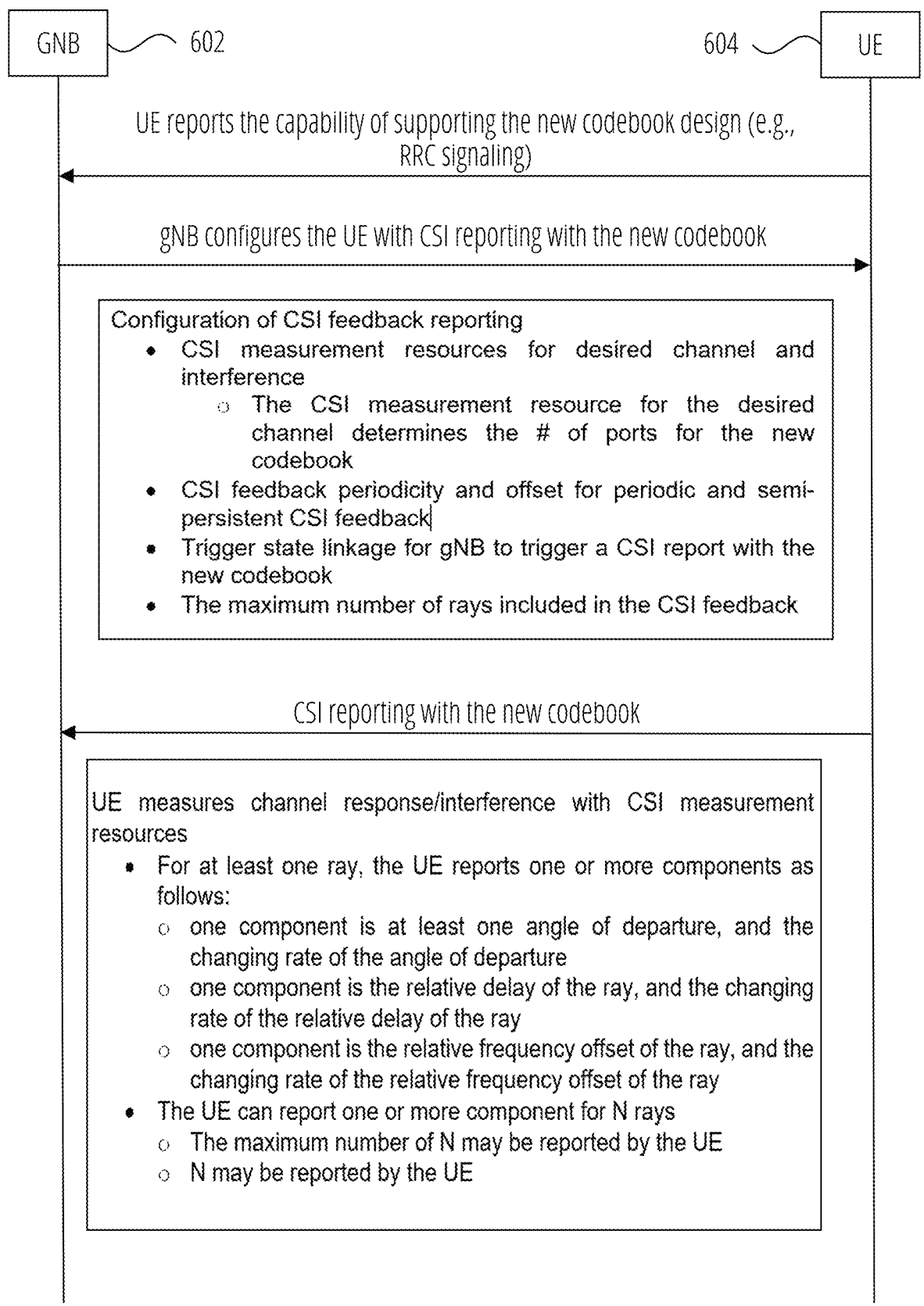
FIG. 6 is a flowchart illustrating a method for CSI reporting with a new codebook design in accordance with one embodiment.

FIG. 6 is a flowchart illustrating a method for CSI reporting with the new codebook design according to one embodiment. The illustrated processing flow between a gNB 602 (or other base station) and a UE 604 is provided to cover the modeling and feedback of any spatial beam, relative delay, or relative frequency offset. As shown, the UE 604 reports the capability of supporting the new codebook design (e.g., RRC signaling). The gNB 602 configures the UE with CSI reporting with the new codebook. The Configuration of CSI feedback reporting may include CSI measurement resources for desired channel and interference (which may be used to determine the number of ports for the new codebook), CSI feedback periodicity and offset for periodic and semi-persistent CSI feedback, trigger state linkage for gNB to trigger a CSI report with the new codebook, and/or the maximum number of rays included in the CSI feedback.

The UE 604 then performs CSI reporting with the new codebook. For example, the UE measures channel response/interference with CSI measurement resources. For at least one ray, the UE reports one or more components as follows: one component is at least one angle of departure, and the changing rate of the angle of departure; one component is the relative delay of the ray, and the changing rate of the relative delay of the ray; and/or one component is the relative frequency offset of the ray, and the changing rate of the relative frequency offset of the ray. The UE can report one or more component for N rays: the maximum number of N may be reported by the UE; and/or N may be reported by the UE.

ADDITIONAL EXAMPLE EMBODIMENTS

Certain embodiments disclosed herein introduce parameters to model in the spatial beams, delay, Doppler offset due to UE's, base station's, or reflector's movement.

Predicative CSI has been proposed for NTN by some companies. Certain embodiments disclosed herein consider extending the Type II CSI report for very high speed scenarios such as encountered in NTN.

As an example, a high speed train scenarios is considered, i.e. the train moves between two towers, then the delay taps tend to be concentrated around two clusters due to the transmissions from two towers, and the Doppler spreads tend to be at two clusters also corresponding to the transmissions from two towers. Hence the restraint introduced in 3GPP Rel-16 for $N_3>19$ may not be suitable for those cases. Separate indications of FD component selections and TD component selections or the joint selections of FD/TD components can be considered.

Then there can be two clusters for FD components, and two clusters for TD components, then frame work from Rel-16 can be used in duplication, with one center around 0, and another center around another FD component. Similar selection for TD components can be pursued.

Another alternative is to use bitmap for FD component selection and use bitmap for TD component selection, which provides flexible selection for FD/TD components with two or more clusters, however the signaling overhead may be more than the more restrictive design.

As the UE moves (or a major reflector moves), the angles of departures from the gNB, the delay, and Doppler shift with a significant tap can change. The Doppler shift change can be modelled as the HST (High Speed Train) channel model, the spatial beams (angles of departure) change can be modeled with an initial location of spatial beams (vertical and horizontal beam indices) and incremental spatial beam steps (according to the UE/reflector's move), or alternatively or additionally with two locations of spatial beams. The change can be assumed to be linear to simplify the model. Considering other scenarios, such as a high speed train approaches a train station or leaves from a train station, the acceleration aspects may be modelled as well, then a 2nd order polynomial or other models can be used for that purpose. Similarly, a linear or nonlinear model can be applied for delay and Doppler shift.

Or the UE's velocity with respect to a standardized coordinate system can be reported by the UE to the gNB. However, to go from the UE's reported velocity to effect on each beam b may require separate treatment.

Assume the train/UE speed is 360 km/hr, which translates into $360 \times 10^3/3660 = 10^2$ meters/second. Assume the enhanced Type II codebook can be used for 10 to 60 ms, then the distance covered in 10 to 60 ms is $10^2 \times 10 \times 10^{-3}$ meters (or 1.0 meters or 6 meters) or the worst case 6.0 meters which corresponds to 6/3e8=0.02 microseconds, if the reflector moves, the delay change can be doubled: so the change can be at 0.04 microseconds.

For resolution of enhanced Type II codebook, time resolution corresponds to the largest delay difference limited by the frequency domain separation of CSI-RS tones, e.g. 12 tones at given a numerology as in NR. More concretely at SCS of 15 KHz, the largest delay difference $T_{max}$ is $1/(15 \times 10^3 \times 12) = 5.55 \ldots 10^{-6}$ seconds, and proportionally smaller at 30 KHz, 60 KHz, 120 KHz, 240 KHz, etc. The time domain resolution is determined by $N_3$, and given by $T_{max}/N_3$.

For resolution of enhanced Type II codebook, time resolution corresponds to the largest frequency offset difference limited by the time domain separation of CSI-RS RE locations, the smallest separation is assumed to be 2 OFDM symbols roughly $(10^{-3}/14 \times 2)$ seconds, and the largest frequency offset difference is 7000 Hz. And the frequency resolution is given by $N_4$.

For the high speed train scenarios, the model remains valid within the time span of feedback (60 milliseconds). However, for NTN communications, as a satellite can move as fast as 8,100 km/h, then essentially all parameters in the precoder construction including spatial beams, delay taps, Doppler offsets are functions of time. Assume regular movements of the transmitter, the receiver and reflectors, etc, then all the functions are well behaved and can be modeled with low order polynomials, exponential functions, sine or cosine functions or combinations thereof. Assume a simple linear model, for example, before quantization the spatial beam can be given by $(\theta_{b,p} + \Delta\theta_{b,p} \cdot t, \phi_{b,p} + \Delta\phi_{b,p} \cdot t)$, and the delay tap can be represented by $\tau_{b,p} + \Delta\tau_{b,p} \cdot t$ and the delay offset can be represented by $f_{b,p} + \Delta f_{b,p} \cdot t$.

Figure 7:
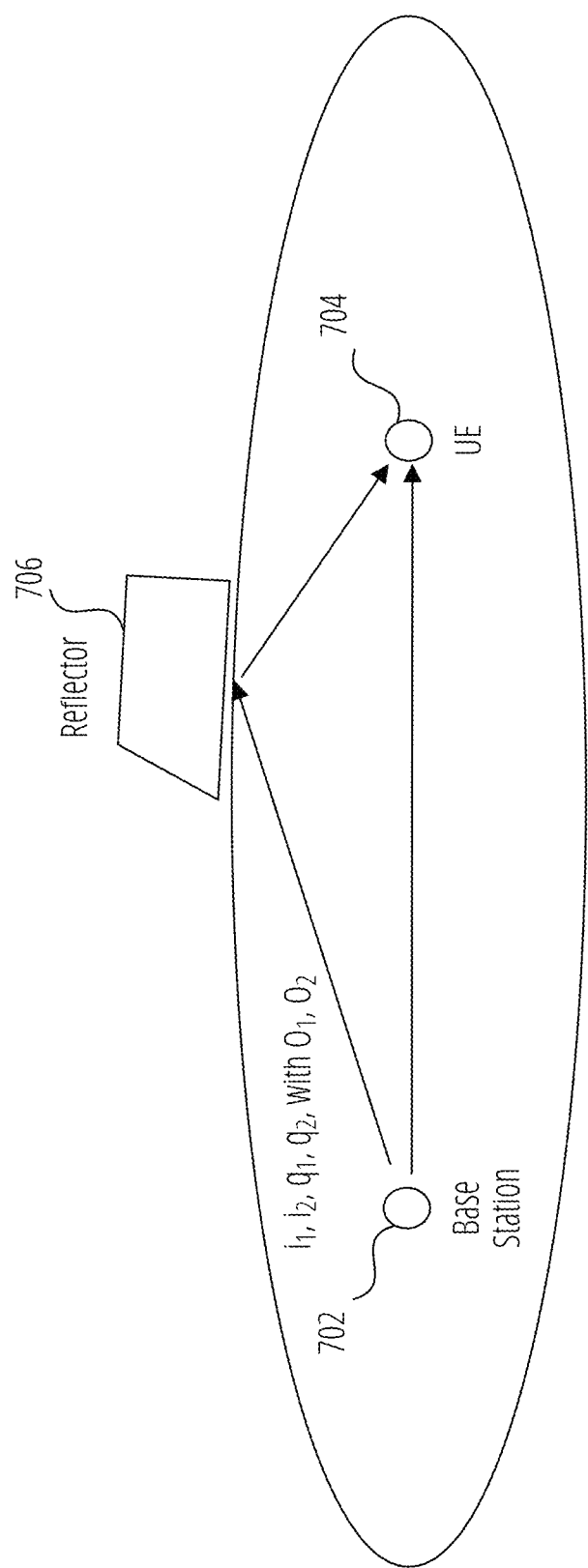
FIG. 7 illustrates constraint among parameters for a wireless channel/pre coder in accordance with one embodiment.

However, as there can be a geometric explanation behind the statistical model, there can be a way to explore the correlation among spatial beam, delay, Doppler offset by extending the Joseph Liberti's model to consider the Doppler effect as well. For example, FIG. 7 illustrates constraint among parameters for a wireless channel/precoder. From example, once the relative delay and the UE's position is given, the reflector is constrained on the ellipse with the gNB and the UE as the foci, further with the spatial beam $i_1$, $i_2$, $q_1$, $q_2$ with the given $O_1$, $O_2$), the reflector is constrained at the interception of the line and the ellipse, also the orientation of the reflector can be determined, it is constrained by the plane containing the line and the UE's position. Of course, in actual radio propagation condition, the situation can be far more complicated, i.e. such a model may not work all the time. However, when the model works, e.g. from a delay tap measurement with confidence, then the range for variation for the rest parameters can be much reduced, and the involved signaling overhead can be reduced. To handle the case where the constructed model does not work, note some kind of bitmap (membership) indication can be used to signal whether some parameters cannot be handled that way, and existing or proposed methods as described below can be considered.

Assume the object's velocity is estimated, then the object's trajectory can be predicted. Here the movement of the transmitter, the receiver and the reflector is perceived by the receiver (UE) itself, and relevant information can be fed back to gNB.

Figure 8:
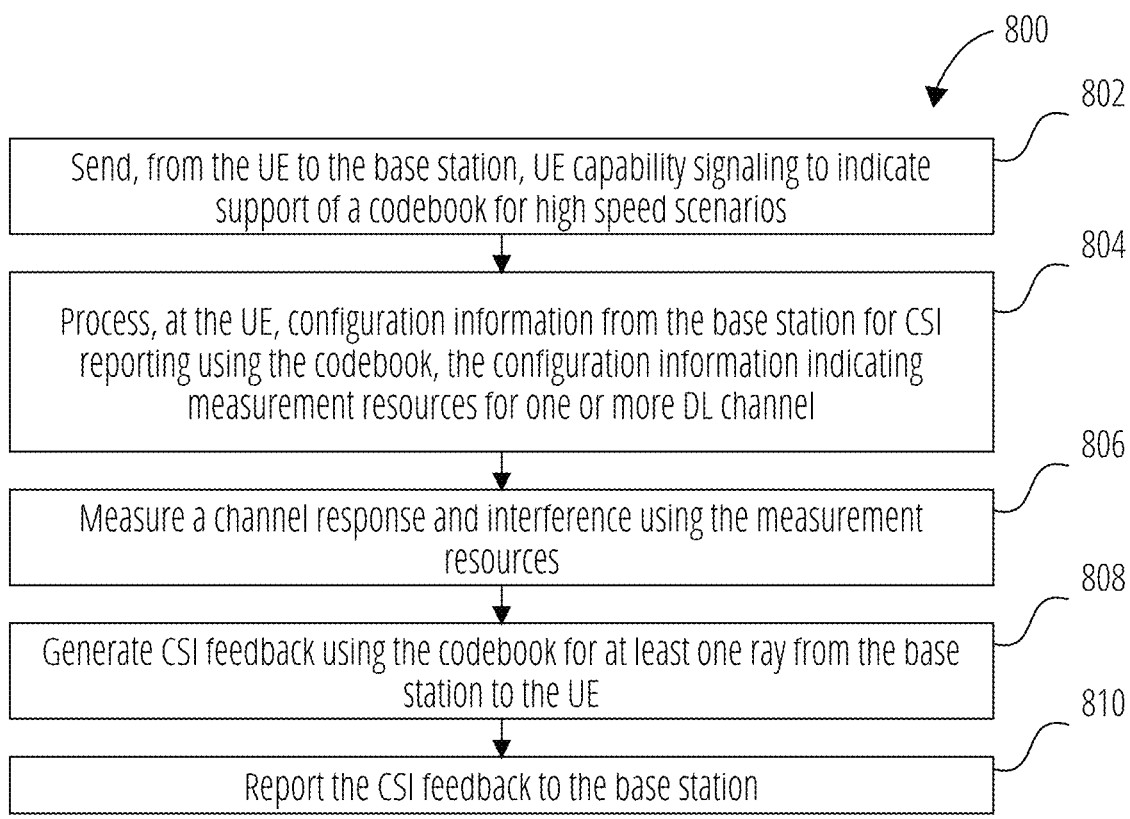
FIG. 8 is a flowchart of a method for a UE to report CSI to a base station according to one embodiment.

FIG. 8 is a flowchart of a method 800 for a UE to report CSI to a base station according to one embodiment. In block 802, the method 800 includes sending, from the UE to the base station, UE capability signaling to indicate support of a codebook for high speed scenarios. In block 804, the method 800 includes processing, at the UE, configuration information from the base station for CSI reporting using the codebook. The configuration information indicates measurement resources for one or more DL channel. In block 806, the method 800 includes measuring a channel response and interference using the measurement resources. In block 808, the method 800 includes generating CSI feedback using the codebook for at least one ray from the base station to the UE. In block 810, the method 800 includes reporting the CSI feedback to the base station.

In certain embodiments of the method 800, the CSI feedback comprises components corresponding to one or more of: an angle of departure of the at least one ray and a first changing rate of the angle of departure; a relative delay of the at least one ray and a second changing rate of the relative delay; and a relative frequency offset of the at least one ray and a third changing rate of the relative frequency offset.

In certain embodiments of the method 800, a spatial beam variation, corresponding to the angle of departure and the first changing rate of the angle of departure, is modeled with a linear model: $(\theta_{b,p} \Delta\theta_{b,p} \cdot t, \phi_{b,p}+\Delta\phi_{b,p} \cdot t)$, where p is a polarization index, b is a ray index, $\theta_{b,p}$ is a zenith angle of departure, $\phi_{b,p}$ is an azimuth angle of departure, $\Delta\theta_{b,p}$ is a change in the zenith angle of departure, $\phi_{b,p}$ is a change in the azimuth angle of departure, and t is time.

In certain embodiments of the method 800, the relative delay is modeled with a linear model: $\tau_{b,p}+\Delta\tau_{b,p} \cdot t$, where p is a polarization index, b is a ray index, $\tau_{b,p}$ is the relative delay, $\Delta\tau_{b,p}$ is a change in the relative delay, and t is time.

In certain embodiments of the method 800, the relative frequency offset is modeled with a linear model: $f_{b,p}+\Delta f_{b,p} \cdot t$, where p is a polarization index, b is a ray index, $f_{b,p}$ is the relative frequency offset, $\Delta f_{b,p}$ is a change in the relative frequency offset, and t is time.

In certain embodiments of the method 800, the at least one ray comprises N number of rays, and the method further comprises reporting, from the UE to the base station, an indication of a maximum number of the N number of rays included in the CSI feedback.

In certain embodiments of the method 800, the at least one ray comprises N number of rays, and the method further comprises reporting, from the UE to the base station, an indication of the N number of rays included in the CSI feedback.

In certain embodiments of the method 800, the configuration information comprises one or more of: a CSI periodicity and an offset for periodic and semi-persistent CSI feedback; a trigger state linkage for the base station to trigger a CSI report with the codebook; and a maximum number of rays to include when generating the CSI feedback.

Figure 9:
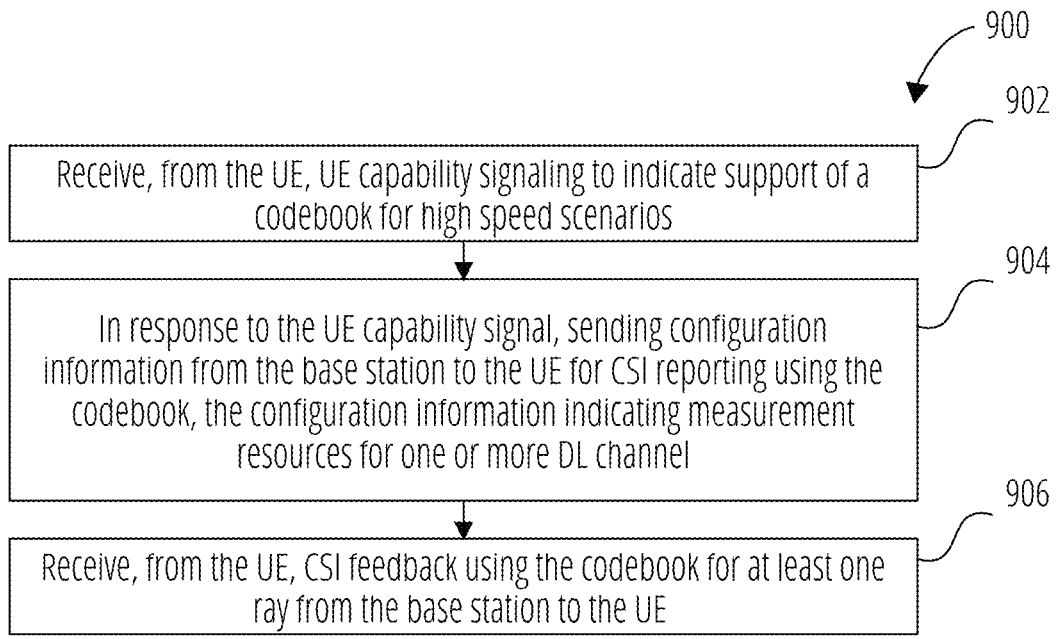
FIG. 9 is a flowchart of a method for a base station to configure a UE to report CSI according to one embodiment.

FIG. 9 is a flowchart of a method 900 for a base station to configure a UE to report CSI according to one embodiment. In block 902, the method 900 includes receiving, from the UE, UE capability signaling to indicate support of a codebook for high speed scenarios. In block 904, in response to the UE capability signals, the method 900 includes sending configuration information from the base station to the UE for CSI reporting using the codebook. The configuration information indicates measurement resources for one or more DL channel. In block 906, the method 900 includes receiving, from the UE, CSI feedback using the codebook for at least one ray from the base station to the UE.

In certain embodiments of the method 900, the CSI feedback comprises components corresponding to one or more of: an angle of departure of the at least one ray and a first changing rate of the angle of departure; a relative delay of the at least one ray and a second changing rate of the relative delay; and a relative frequency offset of the at least one ray and a third changing rate of the relative frequency offset.

In certain embodiments of the method 900, a spatial beam variation, corresponding to the angle of departure and the first changing rate of the angle of departure, is modeled with a linear model: $(\theta_{b,p}+\Delta\theta_{b,p} \cdot t, \phi_{b,p}+\Delta\phi_{b,p} \cdot t)$, where p is a polarization index, b is a ray index, $\theta_{b,p}$ is a zenith angle of departure, $\phi_{b,p}$ is an azimuth angle of departure, $\Delta\theta_{b,p}$ is a change in the zenith angle of departure, $\phi_{b,p}$ is a change in the azimuth angle of departure, and t is time.

In certain embodiments of the method 900, the relative delay is modeled with a linear model: $\tau_{b,p}+\Delta\tau_{b,p} \cdot t$, where p is a polarization index, b is a ray index, $\tau_{b,p}$ is the relative delay, $\Delta\tau_{b,p}$ is a change in the relative delay, and t is time.

In certain embodiments of the method 900, the relative frequency offset is modeled with a linear model: $f_{b,p}+\Delta f_{b,p} \cdot t$, where p is a polarization index, b is a ray index, $f_{b,p}$ is the relative frequency offset, $\Delta f_{b,p}$ is a change in the relative frequency offset, and t is time.

In certain embodiments of the method 900, the at least one ray comprises N number of rays, and the method further comprises receiving, from the UE, an indication of a maximum number of the N number of rays included in the CSI feedback.

In certain embodiments of the method 900, the at least one ray comprises N number of rays, and the method further comprises receiving, from the UE, an indication of the N number of rays included in the CSI feedback.

In certain embodiments of the method 900, the configuration information comprises one or more of: a CSI periodicity and an offset for periodic and semi-persistent CSI feedback; a trigger state linkage for the base station to trigger a CSI report with the codebook; and a maximum number of rays to include when generating the CSI feedback.

Figure 10:
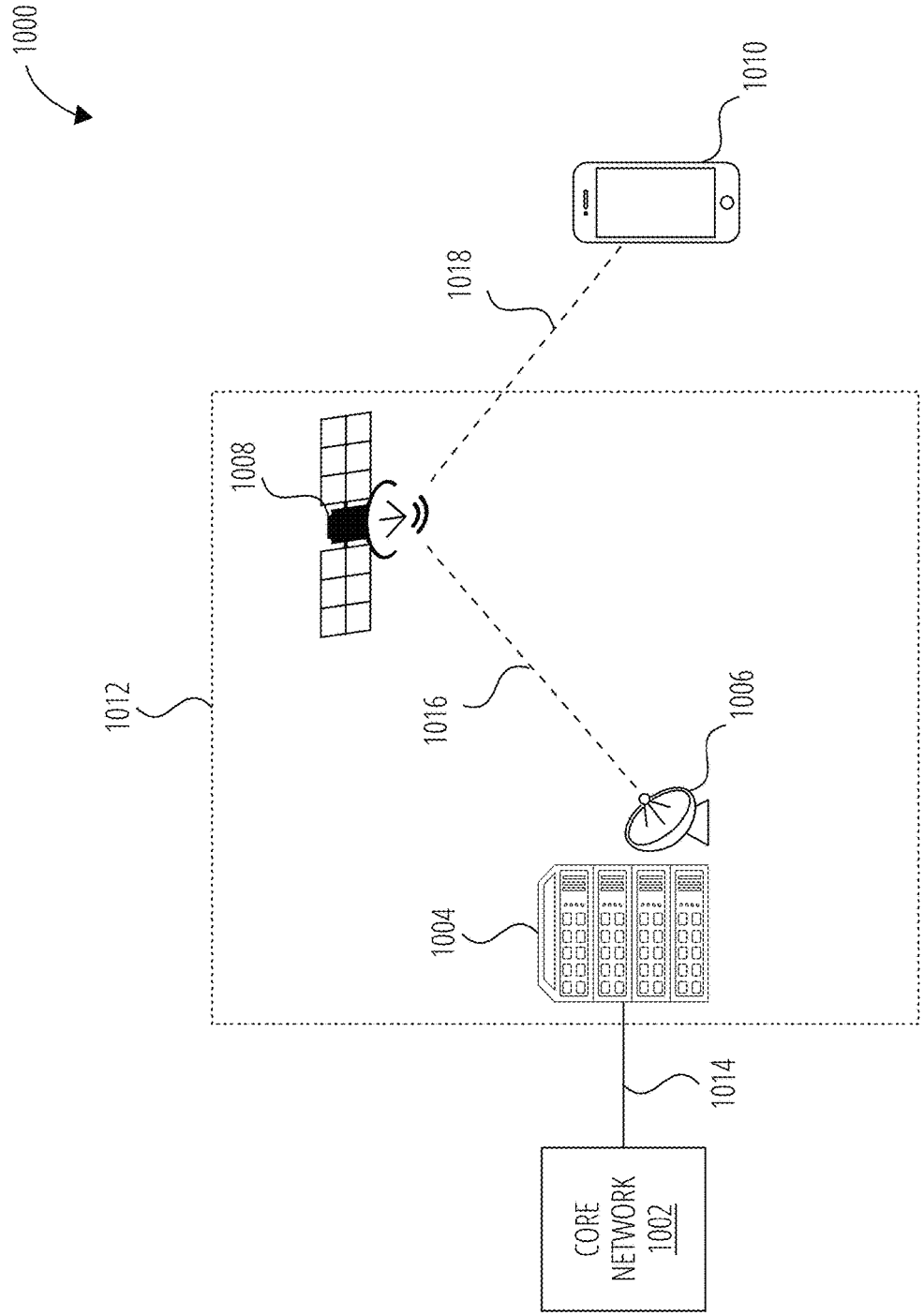
FIG. 10 illustrates a non-terrestrial network (NTN) architecture of a wireless communication system, according to an embodiment.

FIG. 10 illustrates a non-terrestrial network (NTN) architecture 100 of a wireless communication system, according to an embodiment. The NTN architecture 1000 includes a core network (CN) 1002, a terrestrial base station 1004, a satellite gateway 1006, a satellite 1008, and a UE 1010. The terrestrial base station 1004, the satellite gateway 1006, and the satellite 1008 may be included in a RAN 1012.

In some embodiments, the RAN 1012 includes E-UTRAN, the CN 1002 includes an EPC, and the terrestrial base station 1004 includes an eNB. In these cases, the CN link 1014 connecting the CN 1002 and the terrestrial base station 1004 may include an S1 interface.

In some embodiments, RAN 1012 includes NG-RAN, the CN 1002 includes a 5GC, and the terrestrial base station 1004 includes a gNB or a next generation eNB (ng-eNB). In such cases, the CN link 1014 connecting the CN 1002 and the terrestrial base station 1004 may include an NG interface.

The NTN architecture 1000 illustrates a "bent-pipe" or "transparent" satellite based architecture. In such bent-pipe systems, the terrestrial base station 1004 uses the satellite gateway 1006 to communicate with the satellite 1008 over a feeder link 1016. The satellite 1008 may be equipped with one or more antennas capable of broadcasting a cell according to the RAN 1012, and the UE 1010 may be equipped with one or more antennas (e.g., a moving parabolic antenna, an omni-directional phased-array antenna, etc.) capable of communicating with the satellite 1008 via a Uu interface on that cell (such communications may be said to use the illustrated service link 1018). A payload sited on the satellite 1008 then transparently forwards data between the satellite gateway 1006 and the UE 1010 using the feeder link 1016 between the satellite gateway 1006 and the satellite 1008 and the service link 1018 between the satellite 1008 and the UE 1010. The payload may perform RF conversion and/or amplification in both uplink (UL) and downlink (DL) to enable this communication.

In the embodiment shown in FIG. 10, the terrestrial base station 1004 is illustrated without the capability of terrestrial wireless communication directly with a UE. However, it is contemplated that in other embodiments, such a terrestrial base station using the satellite gateway 1006 to communicate with the satellite 1008 could (also) have this functionality (i.e., as in the terrestrial base station 1212 and the terrestrial base station 1214 of FIG. 12, to be described below).

Figure 11:
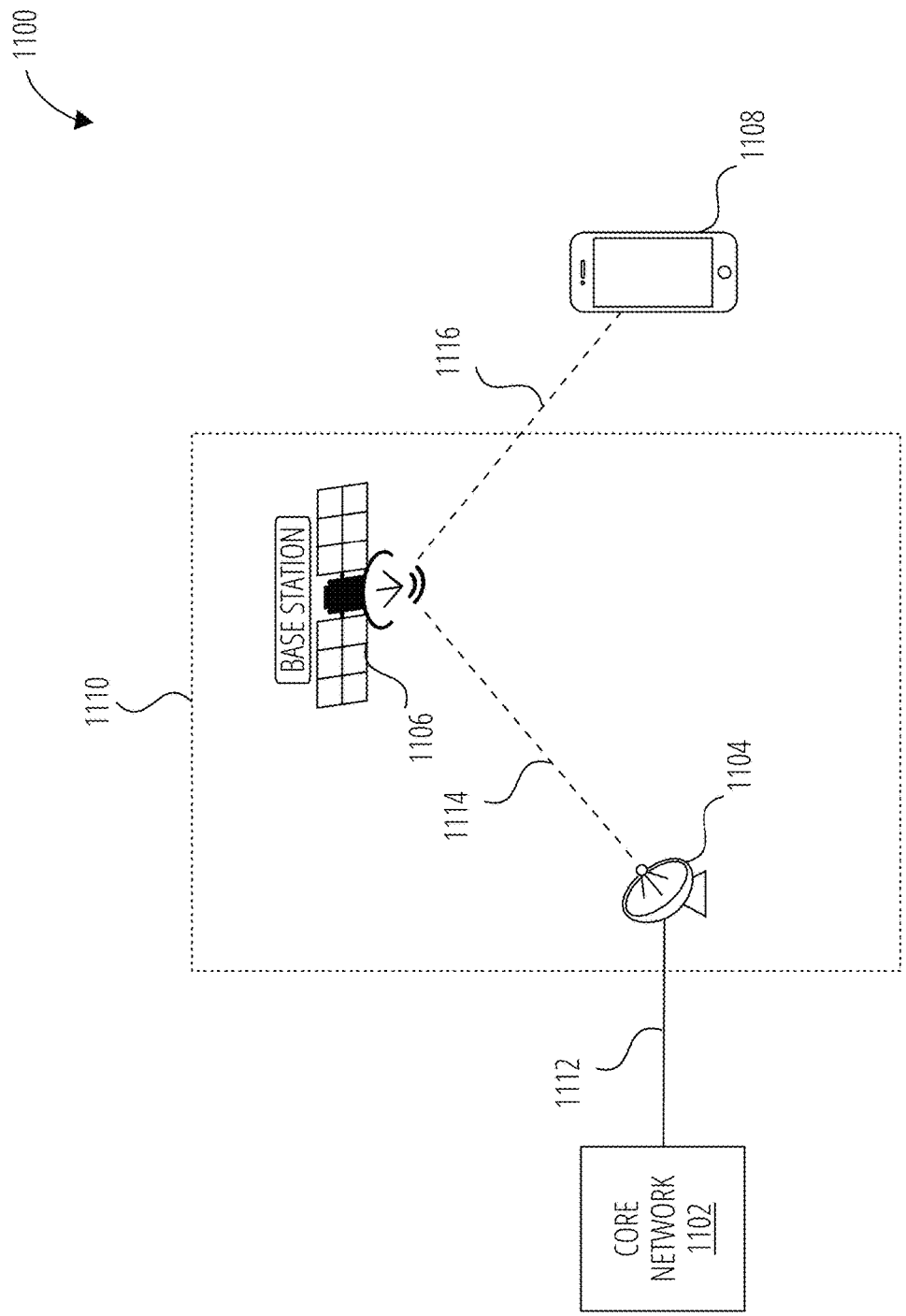
FIG. 11 illustrates an NTN architecture of a wireless communication system, according to an embodiment.

FIG. 11 illustrates an NTN architecture 1100 of a wireless communication system, according to an embodiment. The NTN architecture 1100 includes a CN 1102, a satellite gateway 1104, a satellite base station 1106, and a UE 1108. The satellite gateway 1104 and the satellite base station 1106 may be included in the RAN 1110.

In some embodiments, the RAN 1110 includes E-UTRAN and the CN 1102 includes an EPC. In these cases, the CN link 1112 connecting the CN 1102 and the satellite gateway 1104 may include an S1 interface.

In some embodiments, RAN 1110 includes NG-RAN and the CN 1102 includes a 5GC. In such cases, the CN link 1112 connecting the CN 1102 and the satellite gateway 1104 may include an NG interface.

The NTN architecture 1000 implements a "regenerative" satellite based architecture. In such regenerative systems, the functionalities of a base station are sited on the satellite base station 1106, and the communications between these base station functions and the CN 1102 occur through a forwarding of interface(s) (e.g., a S1 interface and/or an NG interface) found on the CN link 1112 through the satellite gateway 1104 and a feeder link 1114 to the satellite base station 1106. The satellite base station 1106 may be equipped with one or more antennas capable of broadcasting a cell according to the RAN 1110, and the UE 1108 may be equipped with one or more antennas (e.g., a moving parabolic antenna, an omni-directional phased-array antenna, etc.) capable of communicating with the satellite base station 1106 via a Uu interface on that cell (such communications may be said to use the illustrated service link 1116). A payload sited on the satellite base station 1106 then forwards data between the satellite gateway 1104 and the UE 1108 using the feeder link 1114 between the satellite gateway 1104 and the satellite base station 1106 and the service link 1116 between the satellite base station 1106 and the UE 1108. The payload may perform RF conversion and/or amplification in both uplink (UL) and downlink (DL) to enable this communication, as well as implement the functionalities of the base station (e.g., as an eNB, ng-eNB or a gNB, as corresponding to the type of the RAN 1110) as these have been sited on the satellite base station 1106.

In embodiments of NTN architectures comprising NG-RAN that also use integrated access and backhaul (IAB), it is possible that a gNB control unit functionality (CU) could be sited terrestrially and may use a satellite gateway to communicate with a satellite that hosts a corresponding gNB donor unit functionality (DU), with the F1 interface(s) between the CU and the DU underpinned by the feeder link 1114. In such cases, the CU and the DU may each be understood to be part of the NG-RAN.

Figure 12:
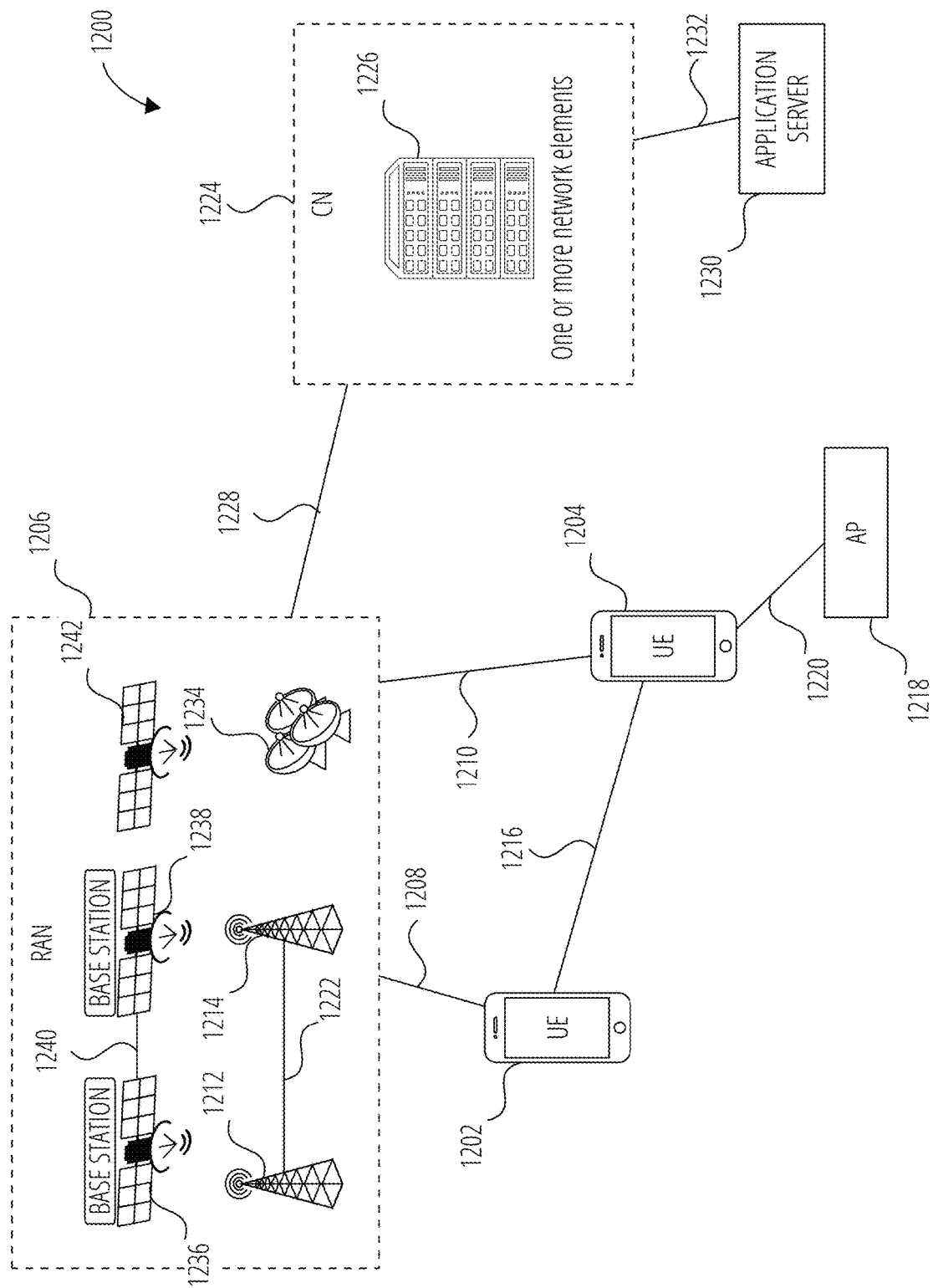
FIG. 12 illustrates an example architecture of a wireless communication system, according to embodiments disclosed herein.

FIG. 12 illustrates an example architecture of a wireless communication system 1200, according to embodiments disclosed herein. The following description is provided for an example wireless communication system 1200 that operates in conjunction with the LTE system standards and/or 5G or NR system standards as provided by 3GPP technical specifications and other 3GPP documents.

As shown by FIG. 12, the wireless communication system 1200 includes UE 1202 and UE 1204 (although any number of UEs may be used). In this example, the UE 1202 and the UE 1204 are illustrated as smartphones (e.g., handheld touchscreen mobile computing devices connectable to one or more cellular networks), but may also comprise any mobile or non-mobile computing device configured for wireless communication.

The UE 1202 and UE 1204 may be configured to communicatively couple with a RAN 1206. In embodiments, the RAN 1206 may be NG-RAN, E-UTRAN, etc. The UE 1202 and UE 1204 utilize connections (or channels) (shown as connection 1208 and connection 1210, respectively) with the RAN 1206, each of which comprises a physical communications interface. The RAN 1206 can include one or more base stations (such as terrestrial base station 1212, the terrestrial base station 1214 the satellite base station 1236 and the satellite base station 1238) and/or other entities (e.g., the satellite 1242, which may not have base station functionality) that enable the connection 1208 and connection 1210. One or more satellite gateways 1234 may integrate the satellite base station 1236, satellite base station 1238, and/or the satellite 1242 into the RAN 1206, in the manners (and with the appropriate elements) described in relation to the NTN architecture 1000 of FIG. 10 and the NTN architecture 1100 of FIG. 11.

In this example, the connection 1208 and connection 1210 are air interfaces to enable such communicative coupling, and may be consistent with RAT(s) used by the RAN 1206, such as, for example, an LTE and/or NR. It is contemplated that the connection 1208 and connection 1210 may include, in some embodiments, service links between their respective UE 1202, UE 1204 and one or more of the satellite base station 1236, the satellite base station 1238, and the satellite 1242.

In some embodiments, the UE 1202 and UE 1204 may also directly exchange communication data via a sidelink interface 1216.

The UE 1204 is shown to be configured to access an access point (shown as AP 1218) via connection 1220. By way of example, the connection 1220 can comprise a local wireless connection, such as a connection consistent with any IEEE 802.11 protocol, wherein the AP 1218 may comprise a Wi-Fi® router. In this example, the AP 1218 may be connected to another network (for example, the Internet) without going through a CN 1224.

In embodiments, the UE 1202 and UE 1204 can be configured to communicate using orthogonal frequency division multiplexing (OFDM) communication signals with each other, with the terrestrial base station 1212, the terrestrial base station 1214, the satellite base station 1236, the satellite base station 1238, and/or the satellite 1242 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the terrestrial base station 1212, terrestrial base station 1214, the satellite base station 1236 and/or the satellite base station 1238 may be implemented as one or more software entities running on server computers as part of a virtual network.

In addition, or in other embodiments, the terrestrial base station 1212 or terrestrial base station 1214 may be configured to communicate with one another via interface 1222. In embodiments where the wireless communication system 1200 is an LTE system (e.g., when the CN 1224 is an EPC), the interface 1222 may be an X2 interface. The X2 interface may be defined between two or more base stations (e.g., two or more eNBs and the like) that connect to an EPC, and/or between two eNBs connecting to the EPC. It is contemplated than an inter-satellite link (ISL) may carry the X2 interface between in the case of two satellite base stations.

In embodiments where the wireless communication system 1200 is an NR system (e.g., when CN 1224 is a 5GC), the interface 1222 may be an Xn interface. An Xn interface is defined between two or more base stations that connect to 5GC (e.g., CN 1224). For example, the Xn interface may be between two or more gNBs that connect to 5GC, a gNB connecting to 5GC and an eNB, between two eNBs connecting to 5GC, and/or two or more satellite base stations via an ISL (as in, e.g., the interface 1240 between the satellite base station 1236 and the satellite base station 1238).

The RAN 1206 is shown to be communicatively coupled to the CN 1224. The CN 1224 may comprise one or more network elements 1226, which are configured to offer various data and telecommunications services to customers/subscribers (e.g., users of UE 1202 and UE 1204) who are connected to the CN 1224 via the RAN 1206. The components of the CN 1224 may be implemented in one physical device or separate physical devices including components to read and execute instructions from a machine-readable or computer-readable medium (e.g., a non-transitory machine-readable storage medium). For example, the components of the CN 1224 may be implemented in one or more processors and/or one or more associated memories.

In embodiments, the CN 1224 may be an EPC, and the RAN 1206 may be connected with the CN 1224 via an S1 interface 1228. In embodiments, the S1 interface 1228 may be split into two parts, an S1 user plane (S1-U) interface, which carries traffic data between the terrestrial base station 1212, terrestrial base station 1214, the satellite base station 1236, or the interface 1240 and a serving gateway (S-GW), and the S1-MME interface, which is a signaling interface between the terrestrial base station 1212, the terrestrial base station 1214 the satellite base station 1236, or the interface 1240 and mobility management entities (MMEs).

In embodiments, the CN 1224 may be a 5GC, and the RAN 1206 may be connected with the CN 1224 via an NG interface 1228. In embodiments, the NG interface 1228 may be split into two parts, an NG user plane (NG-U) interface, which carries traffic data between the terrestrial base station 1212, terrestrial base station 1214, satellite base station 1236, or satellite base station 1238 and a user plane function (UPF), and the S1 control plane (NG-C) interface, which is a signaling interface between the terrestrial base station 1212, terrestrial base station 1214 satellite base station 1236, or satellite base station 1238 and access and mobility management functions (AMFs).

Generally, an application server 1230 may be an element offering applications that use internet protocol (IP) bearer resources with the CN 1224 (e.g., packet switched data services). The application server 1230 can also be configured to support one or more communication services (e.g., VoIP sessions, group communication sessions, etc.) for the UE 1202 and UE 1204 via the CN 1224. The application server 1230 may communicate with the CN 1224 through an IP communications interface 1232.

Figure 13:
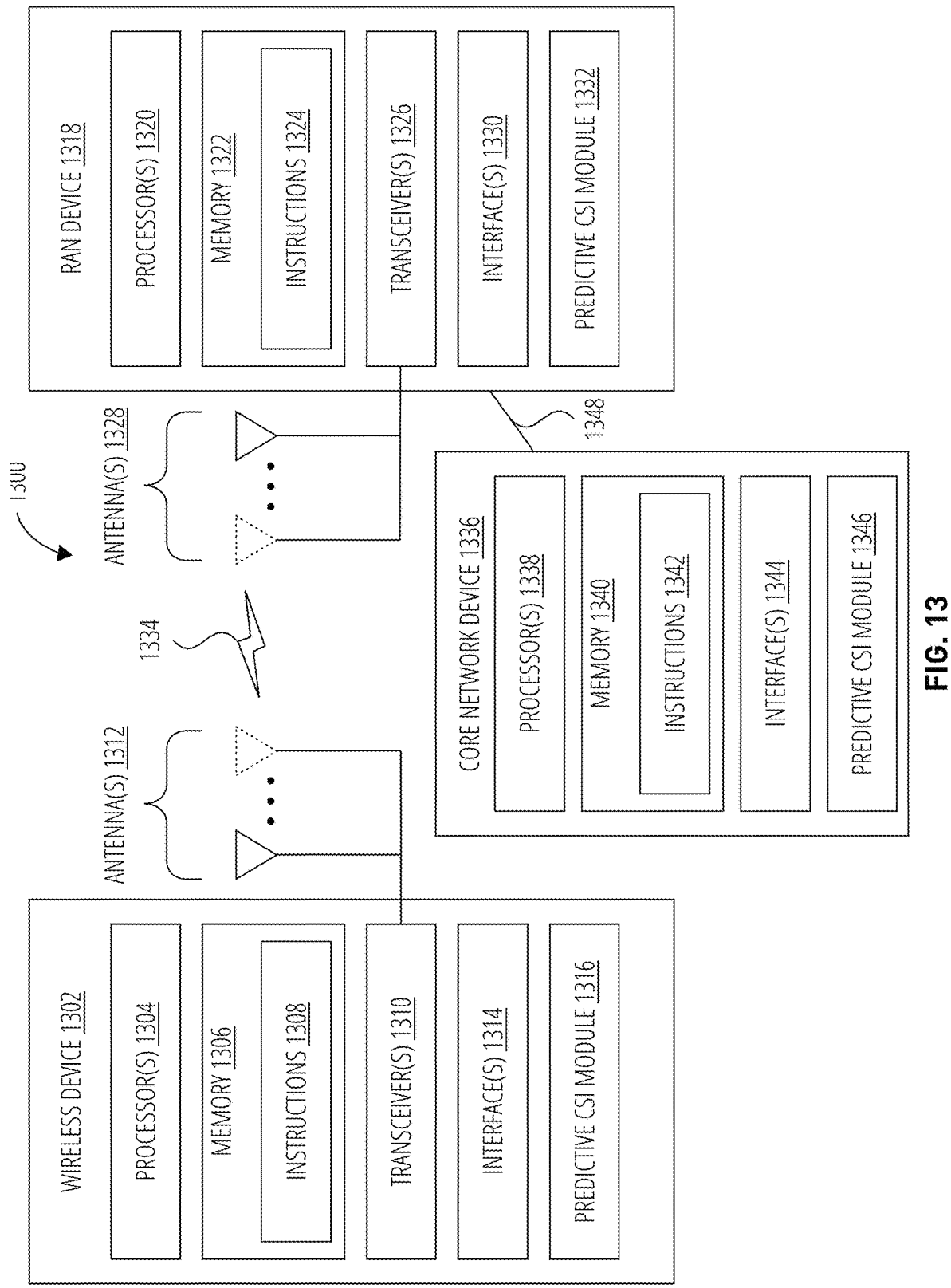
FIG. 13 illustrates a system for performing signaling between a wireless device and a RAN device connected to a core network of a CN device, according to embodiments disclosed herein.

FIG. 13 illustrates a system 1300 for performing signaling 1334 between a wireless device 1302 and a RAN device 1318 connected to a core network of a CN device 1336, according to embodiments disclosed herein. The system 1300 may be a portion of a wireless communications system as herein described. The wireless device 1302 may be, for example, a UE of a wireless communication system. The RAN device 1318 may be, for example, a base station (e.g., an eNB or a gNB) of a wireless communication system that is a terrestrial base station or a satellite base station. The CN device 1336 may be one or more devices making up a CN, as described herein.

The wireless device 1302 may include one or more processor(s) 1304. The processor(s) 1304 may execute instructions such that various operations of the wireless device 1302 are performed, as described herein. The processor(s) 1304 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1302 may include a memory 1306. The memory 1306 may be a non-transitory computer-readable storage medium that stores instructions 1308 (which may include, for example, the instructions being executed by the processor(s) 1304). The instructions 1308 may also be referred to as program code or a computer program. The memory 1306 may also store data used by, and results computed by, the processor(s) 1304.

The wireless device 1302 may include one or more transceiver(s) 1310 that may include radio frequency (RF) transmitter and/or receiver circuitry that use the antenna(s) 1312 of the wireless device 1302 to facilitate signaling (e.g., the signaling 1334) to and/or from the wireless device 1302 with other devices (e.g., the RAN device 1318) according to corresponding RATs. In some embodiments, the antenna(s) 1312 may include a moving parabolic antenna, an omnidirectional phased-array antenna, or some other antenna suitable for communication with a satellite, (e.g., as described above in relation to the UE 1010 of FIG. 10 and the UE 1108 of FIG. 11).

For a RAN device 1318 that is a terrestrial base station, the network device signaling 1334 may occur on a feeder link between the wireless device 1302 and a satellite and a service link between the satellite and the RAN device 1318 (e.g., as described in relation to FIG. 10). For a RAN device 1318 that is a satellite base station, the signaling 1334 may occur on a feeder link between the wireless device 1302 and the RAN device 1318 (e.g., as described in relation to FIG. 11).

The wireless device 1302 may include one or more antenna(s) 1312 (e.g., one, two, four, or more). For embodiments with multiple antenna(s) 1312, the wireless device 1302 may leverage the spatial diversity of such multiple antenna(s) 1312 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1302 may be accomplished according to precoding (or digital beamforming) that is applied at the wireless device 1302 that multiplexes the data streams across the antenna(s) 1312 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1302 may implement analog beamforming techniques, whereby phases of the signals sent by the antenna(s) 1312 are relatively adjusted such that the (joint) transmission of the antenna(s) 1312 can be directed (this is sometimes referred to as beam steering).

The wireless device 1302 may include one or more interface(s) 1314. The interface(s) 1314 may be used to provide input to or output from the wireless device 1302. For example, a wireless device 1302 that is a UE may include interface(s) 1314 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1310/antenna(s) 1312 already described) that allow for communication between the UE and other devices and may operate according to known protocols (e.g., Wi-Fi®, Bluetooth®, and the like).

The wireless device 1302 may include a predictive CSI module 1316. The predictive CSI module 1316 may be implemented via hardware, software, or combinations thereof. For example, the predictive CSI module 1316 may be implemented as a processor, circuit, and/or instructions 1308 stored in the memory 1306 and executed by the processor(s) 1304. In some examples, the predictive CSI module 1316 may be integrated within the processor(s) 1304 and/or the transceiver(s) 1310. For example, the predictive CSI module 1316 may be implemented by a combination of software components (e.g., executed by a DSP or a general processor) and hardware components (e.g., logic gates and circuitry) within the processor(s) 1304 or the transceiver(s) 1310.

The predictive CSI module 1316 may be used for various aspects of the present disclosure, as described herein.

The RAN device 1318 may include one or more processor(s) 1320. The processor(s) 1320 may execute instructions such that various operations of the RAN device 1318 are performed, as described herein. The processor(s) 1304 may include one or more baseband processors implemented using, for example, a CPU, a DSP, an ASIC, a controller, an FPGA device, another hardware device, a firmware device, or any combination thereof configured to perform the operations described herein.

The RAN device 1318 may include a memory 1322. The memory 1322 may be a non-transitory computer-readable storage medium that stores instructions 1324 (which may include, for example, the instructions being executed by the processor(s) 1320). The instructions 1324 may also be referred to as program code or a computer program. The memory 1322 may also store data used by, and results computed by, the processor(s) 1320.

The RAN device 1318 may include one or more transceiver(s) 1326 that may include RF transmitter and/or receiver circuitry that use the antenna(s) 1328 of the RAN device 1318 to facilitate signaling (e.g., the signaling 1334) to and/or from the RAN device 1318 with other devices (e.g., the wireless device 1302) according to corresponding RATs.

The RAN device 1318 may include one or more antenna(s) 1328 (e.g., one, two, four, or more). In embodiments having multiple antenna(s) 1328, the RAN device 1318 may perform MIMO, digital beamforming, analog beamforming, beam steering, etc., as has been described.

For a RAN device 1318 that is a terrestrial base station, one or more of the transceiver(s) 1326 and/or the antenna(s) 1328 may instead be present on a satellite gateway associated with the base station (e.g., as shown in reference to the terrestrial base station 1004 and the satellite gateway 1006 of FIG. 10). For a RAN device 1318 that is a satellite base station, the transceiver(s) 1326 and/or the antenna(s) 1328 may be present on the satellite, and one or more of those antenna(s) 1328 may be antenna(s) appropriate for satellite communication (such as a moving parabolic antenna, an omni-directional phased-array antenna, etc.)

The RAN device 1318 may include one or more interface(s) 1330. The interface(s) 1330 may be used to provide input to or output from the RAN device 1318. For example, a RAN device 1318 that is a base station may include interface(s) 1330 made up of transmitters, receivers, and other circuitry (e.g., other than the transceiver(s) 1326/antenna(s) 1328 already described) that enables the base station to communicate with other equipment in a CN, and/or that enables the base station to communicate with external networks, computers, databases, and the like for purposes of operations, administration, and maintenance of the base station or other equipment operably connected thereto.

The RAN device 1318 may include a predictive CSI module 1332. The predictive CSI module 1332 may be implemented via hardware, software, or combinations thereof. For example, the predictive CSI module 1332 may be implemented as a processor, circuit, and/or instructions 1324 stored in the memory 1322 and executed by the processor(s) 1320. In some examples, the predictive CSI module 1332 may be integrated within the processor(s) 1320 and/or the transceiver(s) 1326. For example, the predictive CSI module 1332 may be implemented by a combination of software components (e.g., executed by a DSP or a general processor) and hardware components (e.g., logic gates and circuitry) within the processor(s) 1320 or the transceiver(s) 1326.

The predictive CSI module 1332 may be used for various aspects of the present disclosure, for example, as described herein.

The RAN device 1318 may communicate with the CN device 1336 via the interface 1348, which may be analogous to the interface 1228 of FIG. 12 (e.g., may be an S1 and/or NG interface, either of which may be split into user plane and control plane parts).

The CN device 1336 may include one or more processor(s) 1338. The processor(s) 1338 may execute instructions such that various operations of the CN device 1336 are performed, as described herein. The processor(s) 1338 may include one or more baseband processors implemented using, for example, a CPU, a DSP, an ASIC, a controller, an FPGA device, another hardware device, a firmware device, or any combination thereof configured to perform the operations described herein.

The CN device 1336 may include a memory 1340. The memory 1340 may be a non-transitory computer-readable storage medium that stores instructions 1342 (which may include, for example, the instructions being executed by the processor(s) 1338). The instructions 1342 may also be referred to as program code or a computer program. The memory 1340 may also store data used by, and results computed by, the processor(s) 1338.

The CN device 1336 may include one or more interface(s) 1344. The interface(s) 1344 may be used to provide input to or output from the CN device 1336. For example, a CN device 1336 may include interface(s) 1330 made up of transmitters, receivers, and other circuitry that enables the CN device 1336 to communicate with other equipment in the CN, and/or that enables the CN device 1336 to communicate with external networks, computers, databases, and the like for purposes of operations, administration, and maintenance of the CN device 1336 or other equipment operably connected thereto.

The CN device 1336 may include a predictive CSI module 1346. The predictive CSI module 1346 may be implemented via hardware, software, or combinations thereof. For example, the predictive CSI module 1346 may be implemented as a processor, circuit, and/or instructions 1342 stored in the memory 1340 and executed by the processor(s) 1338. In some examples, the predictive CSI module 1346 may be integrated within the processor(s) 1338. For example, the predictive CSI module 1346 may be implemented by a combination of software components (e.g., executed by a DSP or a general processor) and hardware components (e.g., logic gates and circuitry) within the processor(s) 1338.

The predictive CSI module 1346 may be used for various aspects of the present disclosure, as described herein For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to report channel state information (CSI) to a base station, the method comprising:
sending, from the UE to the base station, UE capability signaling to indicate support of a codebook for high speed scenarios;
processing, at the UE, configuration information from the base station for CSI reporting using the codebook, the configuration information indicating measurement resources for one or more downlink (DL) channel;
measuring a channel response and interference using the measurement resources;
generating CSI feedback using the codebook for at least one ray from the base station to the UE; and
reporting the CSI feedback to the base station, wherein the CSI feedback comprises components corresponding to a relative delay of the at least one ray and a second changing rate of the relative delay, and wherein the relative delay is modeled with a linear model $\tau_{b,p}+\Delta\tau_{b,p}\cdot t$, where p is a polarization index, b is a ray index, $\tau_{b,p}$ is the relative delay, $\Delta\tau{b,p}$ is a change in the relative delay, and t is time.

2. The method of claim 1, wherein the CSI feedback further comprises components corresponding to one or more of:
an angle of departure of the at least one ray and a first changing rate of the angle of departure; and
a relative frequency offset of the at least one ray and a third changing rate of the relative frequency offset.

3. The method of claim 2, wherein a spatial beam variation, corresponding to the angle of departure and the first changing rate of the angle of departure, is modeled with a linear model:

$$(\theta_{b,p}+\Delta\theta_{b,p}\cdot t, \phi_{b,p}+\Delta\phi_{b,p}\cdot t),$$

where $\theta_{b,p}$ is a zenith angle of departure, $\phi_{b,p}$ is an azimuth angle of departure, $\Delta\theta_{b,p}$ is a change in the zenith angle of departure, and $\phi_{b,p}$ is a change in the azimuth angle of departure.

4. The method of claim 2, wherein the relative frequency offset is modeled with a linear model:

$$f_{b,p}+\Delta f_{b,p}\cdot t,$$

where $f_{b,p}$ is the relative frequency offset, and $\Delta f_{b,p}$ is a change in the relative frequency offset.

5. The method of claim 1, wherein the at least one ray comprises N number of rays, and wherein the method further comprises reporting, from the UE to the base station, an indication of a maximum number of the N number of rays included in the CSI feedback.

6. The method of claim 1, wherein the at least one ray comprises N number of rays, and wherein the method further comprises reporting, from the UE to the base station, an indication of the N number of rays included in the CSI feedback.

7. The method of claim 1, wherein the configuration information comprises one or more of:
a CSI periodicity and an offset for periodic and semi-persistent CSI feedback;
a trigger state linkage for the base station to trigger a CSI report with the codebook; and
a maximum number of rays to include when generating the CSI feedback.

8. A method for a base station to configure a user equipment (UE) to report channel state information (CSI), the method comprising:
receiving, from the UE, UE capability signaling to indicate support of a codebook for high speed scenarios;
in response to the UE capability signaling, sending configuration information from the base station to the UE for CSI reporting using the codebook, the configuration information indicating measurement resources for one or more downlink (DL) channel; and
receiving, from the UE, CSI feedback using the codebook for at least one ray from the base station to the UE,
wherein the CSI feedback comprises components corresponding to a relative delay of the at least one ray and a second changing rate of the relative delay, and
wherein the relative delay is modeled with a linear model $\tau_{b,p}+\Delta\tau_{b,p}\cdot t$, where p is a polarization index, b is a ray index, $\tau_{b,p}$ is the relative delay, $\Delta\tau_{b,p}$ is a change in the relative delay, and t is time.

9. The method of claim 8, wherein the CSI feedback comprises components corresponding to one or more of:
an angle of departure of the at least one ray and a first changing rate of the angle of departure; and
a relative frequency offset of the at least one ray and a third changing rate of the relative frequency offset.

10. The method of claim 9, wherein a spatial beam variation, corresponding to the angle of departure and the first changing rate of the angle of departure, is modeled with a linear model:

$$(\theta_{b,p}+\Delta\theta_{b,p}\cdot t, \phi_{b,p}+\Delta\phi_{b,p}\cdot t),$$

where $\theta_{b,p}$ is a zenith angle of departure, $\phi_{b,p}$ is an azimuth angle of departure, $\Delta\theta_{b,p}$ is a change in the zenith angle of departure, and $\phi_{b,p}$ is a change in the azimuth angle of departure.

11. The method of claim 9, wherein the relative frequency offset is modeled with a linear model:

$$f_{b,p}+\Delta f_{b,p}\cdot t,$$

where $f_{b,p}$ is the relative frequency offset, and $\Delta f_{b,p}$ is a change in the relative frequency offset.

12. The method of claim 8, wherein the at least one ray comprises N number of rays, and wherein the method further comprises receiving, from the UE, an indication of a maximum number of the N number of rays included in the CSI feedback.

13. The method of claim 8, wherein the at least one ray comprises N number of rays, and wherein the method further comprises receiving, from the UE, an indication of the N number of rays included in the CSI feedback.

14. The method of claim 8, wherein the configuration information comprises one or more of:
a CSI periodicity and an offset for periodic and semi-persistent CSI feedback;
a trigger state linkage for the base station to trigger a CSI report with the codebook; and
a maximum number of rays to include when generating the CSI feedback.

15. A user equipment (UE) configured to report channel state information (CSI) to a base station, the UE comprising:
a transceiver; and
at least one processor configured to operate with the transceiver to:
send, from the UE to the base station, UE capability signaling to indicate support of a codebook for high speed scenarios;
process, at the UE, configuration information from the base station for CSI reporting using the codebook, the configuration information indicating measurement resources for one or more downlink (DL) channel;
measure a channel response and interference using the measurement resources;
generate CSI feedback using the codebook for at least one ray from the base station to the UE; and
report the CSI feedback to the base station,
wherein the CSI feedback comprises a relative delay of the at least one ray and a changing rate of the relative delay, and
wherein the relative delay is modeled with a linear model $\tau_{b,p}+\Delta\tau_{b,p}\cdot t$, where p is a polarization index, b is a ray index, $\tau_{b,p}$ is the relative delay, $\Delta\tau_{b,p}$ is a change in the relative delay, and t is time.

16. The UE of claim 15, wherein the CSI feedback comprises an angle of departure of the at least one ray and a changing rate of the angle of departure, and wherein a spatial beam variation, corresponding to the angle of departure and the changing rate of the angle of departure, is modeled with a linear model:

$$(\theta_{b,p}+\Delta\theta_{b,p}\cdot t, \phi_{b,p}+\Delta\phi_{b,p}\cdot t),$$

where $\theta_{b,p}$ is a zenith angle of departure, $\phi_{b,p}$ is an azimuth angle of departure, $\Delta\theta_{b,p}$ is a change in the zenith angle of departure, and $\phi_{b,p}$ is a change in the azimuth angle of departure.

17. The UE of claim 15, wherein the CSI feedback comprises a relative frequency offset of the at least one ray and a changing rate of the relative frequency offset, and wherein the relative frequency offset is modeled with a linear model:

$$f_{b,p}+\Delta f_{b,p}\cdot t,$$

where $f_{b,p}$ is the relative frequency offset, and $\Delta f_{b,p}$ is a change in the relative frequency offset.

* * * * *